(12) United States Patent
Buchner et al.

(10) Patent No.: US 11,884,277 B2
(45) Date of Patent: Jan. 30, 2024

(54) METHOD FOR PRODUCING A MODEL OF THE SURROUNDINGS OF A VEHICLE

(71) Applicant: Bayerische Motoren Werke Aktiengesellschaft, Munich (DE)

(72) Inventors: Martin Buchner, Munich (DE); Tobias Strobel, Feldkirchen (DE); Klaus Dollinger, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 378 days.

(21) Appl. No.: 15/389,677

(22) Filed: Dec. 23, 2016

(65) Prior Publication Data

US 2017/0101097 A1     Apr. 13, 2017

Related U.S. Application Data

(63) Continuation of application No. PCT/EP2015/062773, filed on Jun. 9, 2015.

(30) Foreign Application Priority Data

Jun. 27, 2014  (DE) ..................... 10 2014 212 478.6

(51) Int. Cl.
*B60W 40/06* (2012.01)
*B60W 40/04* (2006.01)
(Continued)

(52) U.S. Cl.
CPC .......... *B60W 40/06* (2013.01); *B60W 30/143* (2013.01); *B60W 40/04* (2013.01);
(Continued)

(58) Field of Classification Search
CPC .... B60W 30/16; B60W 30/143; B60W 30/12; B60W 40/04; B60W 2750/308;
(Continued)

(56) References Cited

U.S. PATENT DOCUMENTS 845,727 A      2/1907  Dewitt et al.
2008/0162010 A1  7/2008  Klotz et al.
(Continued)

FOREIGN PATENT DOCUMENTS

DE          100 49 229 A1    5/2002
DE     10 2004 047 130 A1    4/2006
(Continued)

OTHER PUBLICATIONS

International Search Report (PCT/ISA/210) issued in PCT Application No. PCT/EP2015/062773 dated Dec. 23, 2015 with English-language translation (six (6) pages).
(Continued)

*Primary Examiner* — Bhavesh V Amin
(74) *Attorney, Agent, or Firm* — Crowell & Moring LLP

(57) ABSTRACT

A method provided for producing a model of the surroundings of a vehicle, wherein a lane is determined on the basis of objects, free space boundaries and/or roadway limitations. The lane indicates the zone around the vehicle in which the vehicle can drive freely. The lane includes at least one lane segment, the lane segment comprising at least one lane segment boundary, in particular a front lane segment boundary, a rear lane segment boundary, a left lane segment boundary and a right lane segment boundary. The distance from the vehicle to the lane segment boundary is determined, and the lane is made available to a driver assistance system.

17 Claims, 7 Drawing Sheets

(51) Int. Cl.
*B60W 30/04* (2006.01)
*G08G 1/16* (2006.01)
*B60W 30/14* (2006.01)

(52) U.S. Cl.
CPC ......... *G08G 1/167* (2013.01); *B60W 2552/00* (2020.02); *B60W 2552/05* (2020.02); *B60W 2552/10* (2020.02); *B60W 2552/53* (2020.02); *B60W 2554/4041* (2020.02); *B60W 2554/801* (2020.02); *B60W 2720/12* (2013.01); *B60W 2754/30* (2020.02)

(58) Field of Classification Search
CPC ......... B60W 2550/14; B60W 2720/12; B60W 2550/141; B60W 2550/308; B60W 2550/306; B60W 40/06; B60W 2552/00; B60W 2552/05; B60W 2552/10; B60W 2552/53; B60W 2554/4041; B60W 2554/801; B60W 2754/30; G08G 1/167
See application file for complete search history.

(56) References Cited

U.S. PATENT DOCUMENTS

| | | | | |
|---|---|---|---|---|
| 2008/0258884 | A1* | 10/2008 | Schmitz | G01S 13/931 340/425.5 |
| 2009/0187343 | A1 | 7/2009 | Koch-Groeber et al. | |
| 2010/0085233 | A1 | 4/2010 | Wintermantel et al. | |
| 2010/0114490 | A1 | 5/2010 | Becker | |
| 2013/0079990 | A1* | 3/2013 | Fritsch | G06V 20/588 701/41 |
| 2014/0032108 | A1* | 1/2014 | Zeng | B60W 30/12 701/533 |
| 2015/0039156 | A1* | 2/2015 | Shibata | B60T 7/22 701/1 |
| 2015/0314783 | A1* | 11/2015 | Nespolo | B60W 50/14 701/301 |
| 2016/0221575 | A1* | 8/2016 | Posch | B60W 50/0098 |
| 2016/0272199 | A1* | 9/2016 | Kawahara | G08G 1/04 |

FOREIGN PATENT DOCUMENTS

| | | | |
|---|---|---|---|
| DE | 10 2005 002 504 A1 | 7/2006 | |
| DE | 10 2006 047 131 A1 | 4/2008 | |
| DE | 10 2007 044 761 A1 | 5/2008 | |
| DE | 10 2007 027 495 A1 | 12/2008 | |
| DE | 10 2009 006 747 A1 | 8/2010 | |
| DE | 10 2009 008 747 A1 | 8/2010 | |
| DE | 10 2009 058 488 A1 | 6/2011 | |
| DE | 102009058488 A1 * | 6/2011 | ............ G01S 17/87 |
| DE | 10 2011 016 771 A1 | 10/2012 | |
| DE | 10 2011 056 413 A1 | 6/2013 | |
| DE | 10 2013 005 404 A1 | 9/2013 | |
| EP | 1 400 409 A2 | 3/2004 | |
| EP | 1 557 748 A1 | 7/2005 | |
| EP | 1 731 922 A1 | 12/2006 | |
| EP | 2 043 044 A1 | 4/2009 | |
| EP | 2 339 375 A2 | 6/2011 | |
| EP | 2 571 004 A1 | 3/2013 | |
| WO | WO 2007/104625 A1 | 9/2007 | |
| WO | WO 2008/040341 A1 | 4/2008 | |
| WO | WO 2012/013996 A1 | 2/2012 | |
| WO | WO 2012/139796 A1 | 10/2012 | |
| WO | WO 2013/072167 A1 | 5/2013 | |
| WO | WO 2013/087067 A1 | 6/2013 | |

OTHER PUBLICATIONS

German-language Written Opinion (PCT/ISA/237) issued in PCT Application No. PCT/EP2015/062773 dated Dec. 23, 2015 (six (6) pages).

German Search Report issued in counterpart German Application No. 10 2014 212 478.6 dated Nov. 20, 2014 with partial English-language translation (eleven (11) pages).

German-language German Office Action issued in German application No. 10 2014 212 478.6 dated Nov. 15, 2021 (Six (6) pages).

* cited by examiner

METHOD FOR PRODUCING A MODEL OF THE SURROUNDINGS OF A VEHICLE

CROSS REFERENCE TO RELATED APPLICATIONS

This application is a continuation of PCT International Application No. PCT/EP2015/062773, filed Jun. 9, 2015, which claims priority under 35 U.S.C. § 119 from German Patent Application No. 10 2014 212 478.6, filed Jun. 27, 2014, the entire disclosures of which are herein expressly incorporated by reference.

BACKGROUND AND SUMMARY OF THE INVENTION

The present invention relates to a method for producing a model of the surroundings of a vehicle, a surround model unit, a driver assistance system and a vehicle.

Drivers increasingly want to be assisted by driver assistance systems when guiding vehicles. In this case, a differentiation is made between the following degrees of automation, which are associated with different demands on the driver assistance systems.

"Driver Only" indicates a degree of automation at which the driver continuously, i.e. during the entire drive, takes over the longitudinal control, i.e. the acceleration or deceleration, and the transverse guidance (the steering). If the vehicle has a driver assistance system, the latter will not intervene in the longitudinal control or transverse guidance of the vehicle. Examples of driver assistance systems which do not intervene in the longitudinal control or transverse guidance of the vehicle are, among others, light assistance systems, by means of which headlights can be controlled as a function of the situation, the weather and/or the brightness; distance warning systems, which warn of invisible obstacles, particularly when driving into a parking space; rain assistance systems, which activate the windshield wipers as a function of the water wetting or dirtying of the windshield; an attention assistant which, for example, as a function of the driver's pupillary movements, recommends the taking of a break; a lane change assistant, which warns the driver of a lane change without any prior activation of the direction indicator (turn signal), as described, for example, in European Patent Document EP 1 557 784 A1; a traffic sign assistant, which informs the driver with respect to traffic signs, particularly speed limit signs; a blind-spot assist, which draws the driver's attention to traffic participants in the blind spot of the vehicle, or a rear-view back-up camera system, which supplies information to the driver concerning the area situated behind the vehicle and which is described, for example, in European Patent Document EP 1 400 409 A2. Among others, additional assistance systems are described in International Patent Document WO 2007/104625 A1.

"Assisted" indicates a degree of automation, at which the driver continuously takes on either the transverse guidance or the longitudinal control of the vehicle. Within certain limits, the respectively other driving task is taken on by a driver assistance system. In this case, the driver has to continuously monitor the driver assistance system and has to be ready at any time to completely take over the guidance of the vehicle. Examples of such driver assistance systems are known by the terms "adaptive cruise control" and "parking assistant". Within limits, the adaptive cruise control can take over the longitudinal control of the vehicle and the speed of the vehicle while taking into account the distance from the traffic participant driving ahead. A corresponding radar system is known, for example, from International Patent Document WO 2008/040341 A1. The parking assistant supports the driving into parking spaces, in that it takes over the steering, in which case, however, the forward and rearward movement of the vehicle continues to be taken over by the driver. A corresponding parking assistant is described, for example, in European Patent Document EP 2 043 044 B1.

"Partly Automated" indicates a degree of automation, at which a driver assistance system takes over the transverse guidance as well as the longitudinal control of the vehicle for a certain time period and/or in specific situations. As in the case of an assisted vehicle guidance, the driver has to continuously monitor the driver assistance system and, at any point in time, has to be able to completely take over the vehicle guidance. An example of a driver assistance system, which permits a partly automated vehicle guidance, is known by the name "Autobahn Assistant". The Autobahn assistant can take over the longitudinal control and transverse guidance of the vehicle in the specific situation of driving on the Autobahn up to a certain speed. However, the driver always has to check whether the Autobahn assistant is operating reliably and has to be prepared for an immediate takeover of the vehicle guidance, for example, as a result of a takeover prompt by the driver assistance system.

Also in the case of a degree of automation defined as "highly automated", a driver assistance system takes over the transverse guidance as well as the longitudinal control of the vehicle for a defined time period and/or in specific situations. In contrast to the partially automated vehicle guidance, the driver no longer has to continuously monitor the driver assistance system. If the driver assistance system autonomously detects a system limit, and therefore a secure vehicle guidance by the driver assistance system is no longer ensured, the driver assistance system will prompt the driver to take over the guidance of the vehicle. As an example of a driver assistance system for the highly automated vehicle guidance, an autobahn chauffeur is conceivable. On autobahn-type highways, an autobahn chauffeur could take over the automatic longitudinal control and transverse guidance of the vehicle up to a defined speed limit, in which case the driver would not always have to monitor the autobahn chauffeur. If the autobahn chauffeur were to detect a system limit, such as a not controlled tollgate or an unexpected construction site, the autobahn chauffeur would prompt the driver to take over the vehicle guidance within a defined time period.

Also in the case of a degree of automation indicated to be "fully automated", the driver assistance system will take over the transverse guidance and longitudinal control of the vehicle, however, in a defined application case, this takeover would be complete. The driver does not have to monitor the driver assistance system. Before leaving the application case, the driver assistance system will prompt the driver to take over the driving task while reserving sufficient time. If the driver does not comply with this prompt, the vehicle is changed to a minimal-risk system condition. All system limits are recognized by the driver assistance system and, in all situations, the driver assistance system will be capable of taking up a minimal-risk system condition. An example of a driver assistance system, which permits a "fully automated" driving, could be an autobahn pilot. Up to an upper speed limit on autobahn-type highways, this autobahn pilot could take over the longitudinal control as well as the transverse guidance of the vehicle. In this case, the driver would not have to monitor the autobahn pilot and could carry out other activities, for example, the preparation for a meeting, and could thereby utilize the travel time as much as possible. As soon as the autobahn has to be left, the autobahn pilot would prompt the driver to take over. Should the driver not react to this prompt, the autobahn pilot would brake the speed of the vehicle and preferably direct it to a parking lot or shoulder, where it would be braked to a stop and be kept in a stopped position. A method for the fully automated travel was suggested, for example, in U.S. Pat. No. 845,727 B1.

As soon as a constant monitoring of the driver assistance system is no longer provided, i.e. during partially or highly automated driving, relevant objects, for example, other traffic participants or traffic signs, have to be detected in a highly reliable manner, which cannot always be guaranteed by means of previous methods known, for example, from International Patent Document WO 2013/087067 A1 and by previous driver assistance systems.

Typically, more than one driver assistance system is used in a modern vehicle. For example, a modern vehicle may have an emergency braking assistant which, in the event that a deer jumps onto the road, will initiate a complete braking in time as well as an adaptive cruise control, by means of which the speed of the vehicle is automatically adapted to the speed of the vehicle driving ahead, so that the distance from the latter remains essentially constant.

Both systems access, for example, sensor data of a radar system or laser system, as described, for example, in International Patent Document WO 2012/13996 A1, and carry out calculations independently of one another, in order to implement an object recognition based on the sensor data. The implementation of new driver assistance functions is therefore connected with high programming expenditures. Furthermore, in the case of a further development of a sensor system, all driver assistance functions have to be adapted to this new sensor system.

For the purpose of this application, a "roadway" is that segment of a road on which vehicles are permitted to drive. The roadway forms the cohesive fixed part of the road. A roadway typically has several traffic lanes. It may be provided that the several traffic lanes are traveled by vehicles in the same direction. One example, are structurally separate roadways of an autobahn which typically comprise two or three traffic lanes. However, a roadway may also have two traffic lanes on which vehicles move in opposite directions. On a country road, for example, the two traffic lanes may be separated from one another by a white broken line. However, especially in the case of smaller, for example, local streets, there may be no traffic lane markings, and the drivers of the oncoming vehicles have to provide the lateral separation without any aids in order to avoid a collision. In the present case, the roadway may also include shoulders and/or emergency lanes.

German Patent document DE 10 2007 044 761 A1 describes a method for determining a driving tube extending along a path of movement of a vehicle, within which the vehicle will most probably move. The driving tube is bounded on both sides of the movement path by one driving path edge respectively, in which case at least one of the driving tube edges and additionally at least one piece of traffic lane information is determined, particularly a traffic lane marking representing the traffic lane and the corresponding driving tube edge, by means of which traffic lane marking, an adapted driving tube, particularly an adapted driving tube edge, is determined.

In German Patent document DE 10 2005 002 504 A1, a driver assistance system for motor vehicles was suggested which has a sensor system for detecting the traffic surroundings, a prediction device for predicting a driving tube which the vehicle will probably travel, and an assistance function which draws on the predicted driving tube. The prediction device is designed for simultaneously pursuing several driving tube hypotheses and making them available to the assistance function. The simultaneous pursuing of several driving tube hypotheses is connected with high calculating expenditures.

As a result of the above, the present invention has the object of providing a method for producing a surround model which reduces the expenditures for establishing new driver assistance systems and permits an easier integration of new sensor systems.

According to the invention, this object is achieved by a method for producing a surround model, a surround model unit, a driver assistance system and a vehicle, in accordance with embodiments of the invention.

The method according to the invention for producing a surround model of a vehicle is characterized in that, based on objects, free-space boundaries and/or roadway limitations, a lane is determined, the lane indicating the area surrounding the vehicle that can be freely traveled by the vehicle. The lane comprises at least one lane segment. The lane segment comprises at least one lane segment boundary, particularly a front lane segment boundary, a rear lane segment boundary, a left lane segment boundary and a right lane segment boundary. The vehicle-related distance is determined with respect to the segment boundary, and the lane is made available to a driver assistance system.

By use of the method, an abstract representation of the surroundings of the vehicle can be made available to driver assistance systems. The space represented by the lane can be used for maneuvering the vehicle. Improvements when determining the lane are beneficial to all driver assistance systems which access the surround model provided by way of the method. In particular, new sensor systems can be integrated without requiring a change with respect to the driver assistance systems. Furthermore, the abstraction of the information provided by sensor systems reduces the programming expenditures, which are needed in order to make it possible for many driver assistance systems to access a plurality of sensor systems.

In a first embodiment of the method for producing a surround model, sensor data of at least one sensor system are received. Based on the sensor data, objects, free-space boundaries and roadway limitations are determined. And, the lane is determined based on the determined objects, free-space boundaries and roadway limitations.

The information required within the scope of the method concerning the objects, free-space boundaries and roadway limitations can be obtained by way of sensor data of different sensor systems. For example, radar systems, laser systems, ultrasound systems or camera systems can be used as sensor systems. Radar systems can detect objects also in the case of precipitation or in fog. A laser system is described, for example, in International Patent Document WO 2012/139796 A1. Laser systems can be distinguished by a particularly wide range of the detection area. The detection precision of the ultrasound sensors, as described, for example, in International Patent Document WO 2013/072167 A1, can be particularly high at close range. Camera systems may have a higher resolution than other sensor systems. Infrared camera systems may make it possible to differentiate between living objects and inanimate objects. Camera systems can be combined to form stereo camera systems in order to obtain spacing information.

In this context, sensor data may also be data which are provided by a sensor system in terms of a background system. This may, for example, be map material in which the course of roadways and/or traffic lanes are indicated.

Within the scope of the method, mainly sensor data of sensor systems of the vehicle can be accessed whose surroundings are to be modeled. However, likewise, sensor data of other vehicles may also be used. It is also contemplated to access sensor data of infrastructural sensor systems, such as traffic lights, traffic monitoring cameras, fog sensors or roadway contact loops. In this case, the data can be wirelessly transmitted from vehicle to vehicle or first be transmitted to a background system.

Furthermore, an embodiment of the method for producing a surround model provides that the objects, free-space boundaries and roadway limitations are received, and that the lane is determined based on the received objects, free-space boundaries and roadway limitations.

The method can provide that objects, free-space boundaries and roadway limitations are not only determined on the basis of sensor data of a sensor system but are already made available by a preprocessing system. In this case, the preprocessing system can be arranged in a vehicle whose surroundings are to be modeled, and can process sensor data of sensor systems of this vehicle or sensor data of a sensor system of another vehicle or of a background system. Likewise, it is contemplated that the objects, free-space boundaries and roadway limitations are provided directly by other vehicles or by a background system.

According to another further development of the method for producing a surround model, the lane segment is determined based on traffic lane boundaries.

Most of the time, vehicles move in a traffic lane and change the latter rather infrequently. As a rule, only objects in the currently traveled traffic lane are therefore relevant to a driving vehicle. Objects, free-space boundaries, which are assigned to other traffic lanes, may therefore be hidden from many driver assistance functions. For example, an adaptive cruise control may be designed for keeping a vehicle within the traffic lane by means of steering motions, and to keep the distance from an object driving ahead essentially constant up to a preselected maximum speed. In this case, information concerning objects outside the traffic lane is not required, and lane segments outside the traffic lane boundary do not have to be accessed by the adaptive cruise control. A traffic-lane-based lane, i.e. a lane where the lane segments are determined based on traffic lane boundaries, is therefore advantageous in many situations with a view to the calculating and storage resources to be made available.

Within the scope of the method for producing a surround model, distances of the lane segment boundaries can be indicated not only relative to the vehicle but, as an alternative or in addition, also relative to the traffic lane. In particular, the distances to the lateral lane segment boundaries can be indicated relative to a center line of the traffic lane.

According to a further development of the method for producing a surround model, at least a first lane segment is assigned to a traffic lane traveled by the vehicle, at least a second lane segment is assigned to a traffic lane not traveled by the vehicle, and traffic lanes wherein the first lane segment and the second lane segment have an at least partially common lane segment boundary.

The taking-into-account of lane segments, which are assigned to a traffic lane currently not traveled by the vehicle, can enable a driver assistance system to make evasion recommendations or to carry out an evasion to another traffic lane in an automated manner. For example, on a country road, the second lane segment can be assigned to a traffic lane that is typically traveled by other vehicles in the opposite direction. The determination of a lane segment assigned to it can enable a driver assistance system to determine whether a traffic lane change is possible and whether a slow traffic participant, for example, an agricultural vehicle, situated in the current traffic lane in front of the vehicle, can be passed.

Furthermore, an embodiment of the method for producing a surround model provides that, for at least one lane segment boundary, the rate of change of the vehicle-related distance is determined.

The indication of the rate of change of the vehicle-related distance, i.e. of the first derivation of the vehicle-related distance, can make it possible for a driver assistance system to adapt the acceleration of the vehicle by giving gas (positive acceleration) or braking (negative acceleration) in an anticipatory manner. In the case of a very low rate of change, for example, an acceleration of the vehicle will at first not be necessary, and its rate may at first be kept constant in order to enable the occupants of the vehicle to travel as comfortably as possible. It is only when simultaneously the vehicle-related distance exhibits a deviation from the desired distance that is too high, that a (positive or negative) acceleration will be initiated. If the rate of change is very high, however, an acceleration may already be initiated without exceeding or falling below a predetermined deviation from the desired distance having taken place. For example, an emergency braking of a passenger motor vehicle driving ahead can be recognized earlier and an emergency braking of the own vehicle can already be triggered before there was a falling-below the safety distance. In this manner, a collision with the vehicle driving ahead can most probably be prevented because a longer route will be available for the braking. Likewise, as a result of an earlier acceleration, the absolute amount of the deceleration may be lower and the travel comfort for the occupants may be increased.

According to another embodiment of the method for producing a surround model, the acceleration of the change of the vehicle-related distance is determined with respect to at least one lane segment.

The determination of the acceleration of the change of the vehicle-related distance can permit a still more precise and more anticipatory regulating of the acceleration of the vehicle.

Comparably to the determination of the rate or the acceleration of change of the vehicle-related distance of a lane segment boundary, the rate or the acceleration of change of the traffic-lane-related distance of a lane segment boundary can be determined. In addition to the advantages mentioned above with respect to the determination of the rate or acceleration of change of the vehicle-related distance of the lane segment boundary, the additional or alternative determination of the rate or acceleration of the change of the traffic-lane-related distance can permit a detection of the lane which is less dependent on the vehicle. A lane that is less dependent on the vehicle may be advantageous if it is to be made available to another vehicle.

According to a further development of the method, the type of the lane segment boundary is determined for at least one lane segment boundary.

It may, for example, be indicated whether the lane segment boundary is specified by a bicyclist or the roadway limitation. When driving past a bicyclist, a safety distance of 1.5 meters is to be maintained. In contrast, one can always drive past a roadway limitation without any safety distance. Furthermore, the type of the lane segment limitation can influence the decision as to whether a risky evasion maneuver is carried out around an obstacle or the drive better takes place into the obstacle in a controlled manner. If the obstacle is, for example, a motor vehicle, it may be more sensible to accept the material damages of a collision and to not expose the driver of the vehicle to the risk of an evasion maneuver with an uncertain outcome. On the other hand, the risk of an evasion maneuver may be accepted if the obstacle is a pedestrian whose health would be substantially endangered in the case of a collision. By specifying the type of boundary for each lane segment boundary, driver assistance systems can therefore react more individually to the specific driving situation.

A further development of the method for producing a surround model provides that the lane segment and the vehicle-related distance of the lane segment boundary are determined while taking into account a roadway course and/or a traffic lane course.

Typically, roadways or traffic lanes have not only straight but also curved sections. As a rule, the vehicles follow these curved roadways or traffic lanes. As a rule, it is therefore more significant for driver assistance systems whether a vehicle is situated in front of it with respect to the course of the roadway and/or the course of the traffic lane or in a straight line. If the lane segment and the vehicle-related distance of the lane segment boundary are determined while taking into account a roadway course and/or a traffic lane course, for example, a ring-segment-shaped roadway element and/or traffic lane element can be transformed to a rectangular lane segment, and the curvature of the center line can be indicated for this rectangular lane segment. Rectangular lane segments can simplify the further processing by driver assistance systems.

According to another embodiment of the method for producing a surround model, the lane segment and the vehicle-related distance of the lane segment boundary is determined while taking a predicted driving route into account.

According to an embodiment of the method for producing a surround model, at least one confidence value is indicated for the lane segment. The confidence value indicates the probability with which the lane segment can be freely traveled.

Not every object situated on a roadway or a traffic lane will necessarily be relevant; for example, it is possible to simply drive over a cardboard box. However, a cardboard box will not always be recognized with 100% certainty. Thus, the object detected by a sensor system could also be a flower pot which, if the vehicle were to run over it, could cause considerable damage to the vehicle. In the case of a low confidence value, it may become necessary for the driver to take over a constant monitoring and, as required, even an independent longitudinal control and transverse guidance of the vehicle. On the other hand, in the case of a very high confidence value, a transition can take place to a highly automated or even fully automated degree of automation.

A further development of the method for producing a surround model provides that a standard deviation is indicated for the vehicle-related distance of the lane segment boundary, for the rate of change of the vehicle-related distance of the lane segment boundary and/or for the acceleration of the change of the vehicle-related distance of the lane segment boundary.

Information concerning the standard deviation may make it possible to correspondingly adapt the regulating boundaries of a driver assistance system. When the distance of the lane segment boundary from the vehicle is precisely known, i.e. a low standard deviation is assigned to it, for example, a parking assistant can drive much more closely to the obstacle. In contrast, when the standard deviation is large, a certain safety distance will be maintained for avoiding a collision.

With a view to the surround model unit, the above-described task is achieved by a surround model unit, the surround model unit having a receiving device for receiving objects, free-space boundaries and roadway limitations and/or sensor data of at least one sensor system, and the surround model unit being equipped for implementing one of the above-described methods. The surrounds model unit may include a controller having one or more processors execute program code instructions to implement the methods.

With respect to the driver assistance system, the solution of the above-derived task consists of a driver assistance system, which is equipped for receiving a lane from a, particularly above-described, surround model unit, and which is equipped for regulating at least one operating parameter of a vehicle, particularly its speed and/or its distance from a traffic participant driving ahead, based on the lane.

Finally, a solution to the above-indicated task consists of a vehicle which has a sensor system for detecting the surround of the vehicle as well as an above-described surround model unit and/or a driver assistance system described above.

The vehicle may particularly be a motorized private means of transportation. This mainly involves passenger cars. However, it is also contemplated that the vehicle is a motorcycle.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
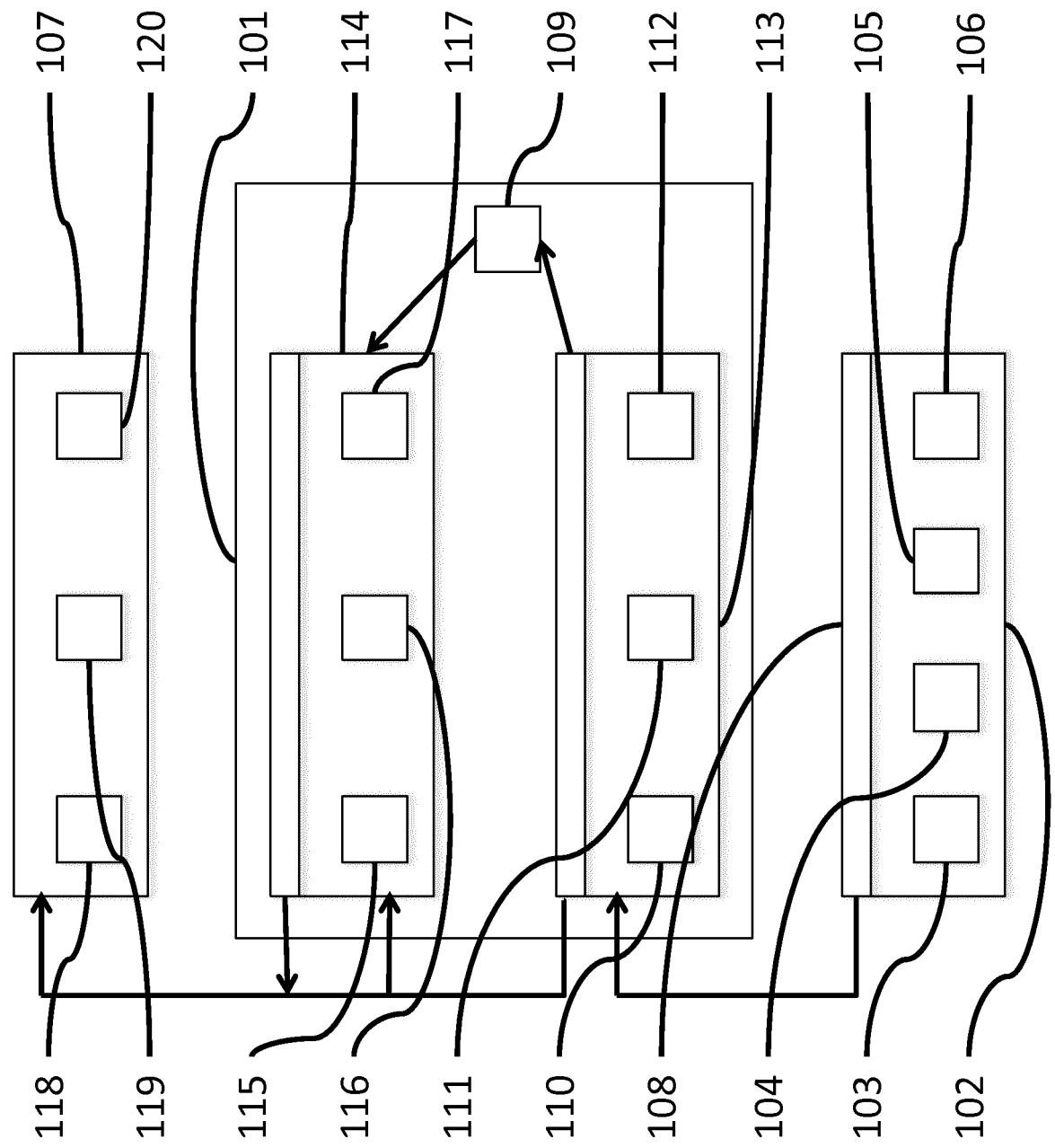
FIG. 1 is an exemplary view of the surround model.

FIG. 1 illustrates an example of an abstract representation of the interaction of a surround model with a group 102 of sensor systems 103, 104, 105, 106 and a driver assistance system 107, by means of which various customer functions can be implemented.

The sensor system 103 may, for example, be a radar sensor; the sensor system 104 may be a camera system; the sensor system 105 may be an ultrasound sensor, and the sensor system 106 may be a digital map.

The sensor systems 103, 104, 105, 106 communicate with the surround model unit 101 by way of an interface 108. For example, information concerning detected objects, free-space boundaries, roadway limitations, traffic lane boundaries, traffic signs or map data are transmitted by way of the interface 108.

Within the scope of the surround model unit 101, the sensor data of the various sensors systems 103, 104, 105 106, are first merged and verified. In the process of the merging, it may, for example, be recognized that an object detected by the sensor system 103 coincides with an object detected by the sensor system 104, so that, in the further course, two objects do not have to be considered separately from one another. A merger 110 of objects is therefore carried out. Concerning the merged object, it can therefore be noted that it was recognized by two sensor systems 103 and 104. Likewise, free-space boundaries recognized by different sensor systems 103, 104, 105, 106, within the scope of a submodel 111, can be combined to a common free-space boundary. One sensor system 103 can, for example, recognize that the free space that is on the left in the travel direction of the vehicle is limited, and another sensor system 103 can cover the area situated behind the vehicle. In addition, within the scope of the surround model, the roadway markings, which are detected on the left side and the right side of the vehicle by different sensor systems, can be evaluated and, in a part 112, a cohesive description of the traffic lane course can be derived.

In this case, the submodels 110, 111, 112 represent a first plane 113, a sensor merging plane, of the surround model 101. The verified and merged information obtained in this plane concerning the objects, the free-space boundaries, roadway limitations, traffic lane boundaries, traffic signs, maps, are made available by way of an output interface to a second plane 114 of the surround model and a background system 109, a so-called backend, so that the obtained information can also be utilized by other vehicles. At the second level 114 of the surround model, a so-called scene description can take place. In this case, the movement history of a detected object can be reproduced in a first submodel. The object can be classified in another submodel 116. For example, on the basis of historical data, it can be determined from the background system 109 whether a vehicle or a pedestrian is involved. In another submodel 117, a lane can, for example, be determined, in which case the area around the vehicle is indicated that can be freely traveled on.

In the following, the information obtained within the scope of the surround model 101 can be used for implementing various assistance functions 118, 119, 120 by way of a driver assistance system 107.

Figure 2:
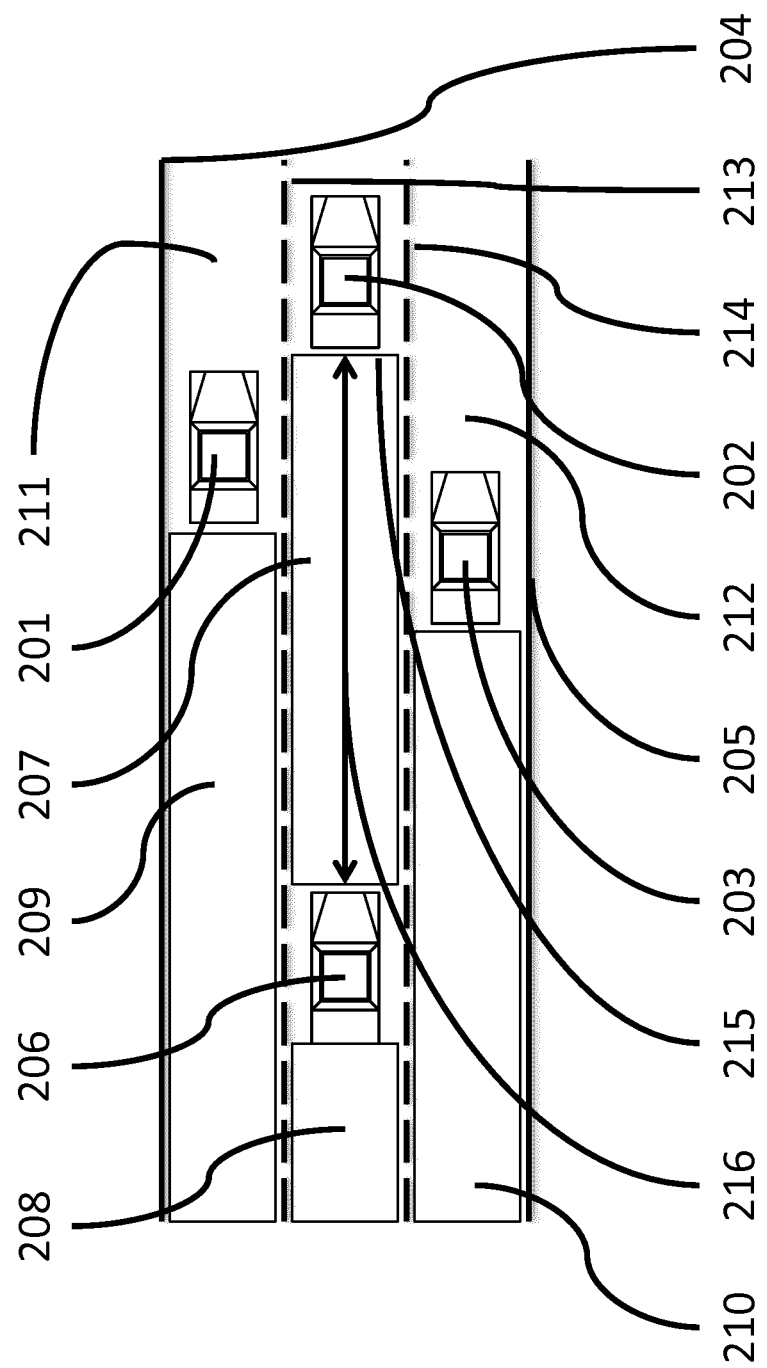
FIG. 2 is a view of an embodiment of a lane.

FIG. 2 illustrates a first example of a lane determined based on objects 201, 202, 203, roadway limitations 204, 205 as well as traffic lane boundaries 207, 208, which lane indicates the area around a vehicle 206 that is freely traveled on. The lane has four lane segments 207, 208, 209, 210. The two lane segments 207, 208 are situated in the same traffic lane as the vehicle 206, which traffic lane is also called an ego traffic lane. In contrast, the two lane segments 209 and 210 are on the left in traffic lane 211 and on the right in traffic lane 212 of the vehicle 206. The lane segment 207 is limited toward the rear by the vehicle 206 and toward the front by the object 202, in which case the object 202 is a vehicle. The lane segment 207 is laterally bounded by the traffic lane boundaries 213, 214. The vehicle-related distance 216 to the forward lane segment boundary 215 of the lane segment 207 is determined. The lane segment 208 is limited toward the rear by a free-space boundary. In the illustrated embodiment, the free-space boundary is specified by the range of the sensor system, which monitors the rear space of the vehicle 206 and is not shown in FIG. 2. The lateral lane segments 209 and 210 are also bounded toward the front in each case by an object 201, 203 in the form of a vehicle. Toward the right and left respectively, the lane segments 209 and 210 are bounded by the traffic lane boundaries 213, 214, and toward the left and right respectively by the roadway limitations 204, 205. The sensor range, in turn, toward the rear defines the free-space boundary as the lane segment boundary of the lane segments 209 and 210.

In the embodiment illustrated in FIG. 2, a lane segment 209, 210 is available on the left as well as on the right, within which the vehicle 206 can travel. A driver assistance system in the form of a Lateral Collision Avoidance System (LCA), to which the lane and thereby the information concerning the lane segments 206, 207, 208, 209) are provided, can therefore refrain from a collision warning in the event of an intended traffic lane change.

Figure 3:
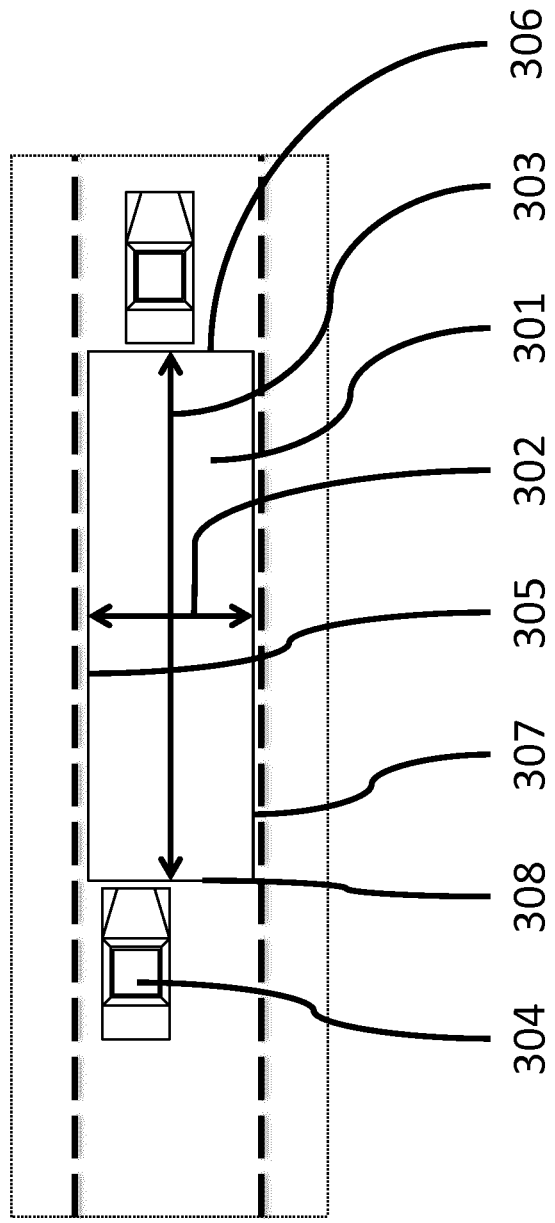
FIG. 3 is a view of a further embodiment of a lane.

The lane segment 301 illustrated in FIG. 3 has a width 302 and a length 303. The indication of a width 302 of a lane segment 301 makes it possible for a driver assistance system to carry out a particularly simple and quick first check as to whether the space on which one can basically travel is also sufficiently wide for the vehicle 304, which is to travel on this lane segment 301. If this check is negative, further checking steps at higher expenditures (Is the safety distance sufficient? Is the distance from the forward lane segment limit 305 reduced, etc?) will not be necessary. In a comparable manner, the specification of a length of a lane segment 301 can also permit a quick check as to whether the lane segment 301 is sufficiently long for receiving the vehicle 304. A driver assistance system in the form of a parking assistant can quickly determine in this data situation, for example, whether a gap between two vehicles parked at the edge of the roadway will be sufficient for parking the vehicle 304 in this gap. The standard deviations can further be indicated for the width 302 and the length 303 of the lane segment 301. On the basis of the standard deviations, driver assistance systems can compute safety margins, particularly safety distances. A confidence value can further be specified for the lane segment 301, which confidence value indicates the safety with which the roadway area represented by the lane segment 301 can be traveled on.

The lane segment 301 has rectangular dimensions. A rectangular lane segment 301 can facilitate the further processing by driver assistance systems. It is basically also contemplated that the lane also comprises lane segments that are not rectangular in order to be able to meet road situations that are difficult to represent as a rectangular lane segment. The rectangular lane segment 301 comprises four lane segment limits 305, 306, 307 and 308. The type of limitation can be specified for every lane segment limit 305, 306, 307, 308. Concerning lane segment limits 305, 307, it may, for example, be noted that they are lane segment limits that are specified by a traffic lane marking. In contrast, it may be noted with respect to lane segment limits 306, 308 as a type of limit that the latter is formed by an object. It may further be provided that one or all lane segment limit(s) 305, 306, 307, 308 also has (have) a reference to the specific object. If a driver assistance system, for example, in the case of a lane segment limit, needs more specific information concerning the limiting object, in this manner, the procurement of information concerning the object can be simplified. A driver assistance system may, for example, react differently depending on whether the object is a pedestrian or a bicyclist. In the case of a bicyclist, it is, for example, not very probable that he will abruptly change his moving direction perpendicularly to the previous direction. Rather, he would ride through a more or less large radius. In the case of a pedestrian, the risk of a sudden change of the moving direction should be rated to be significantly higher.

Figure 4:
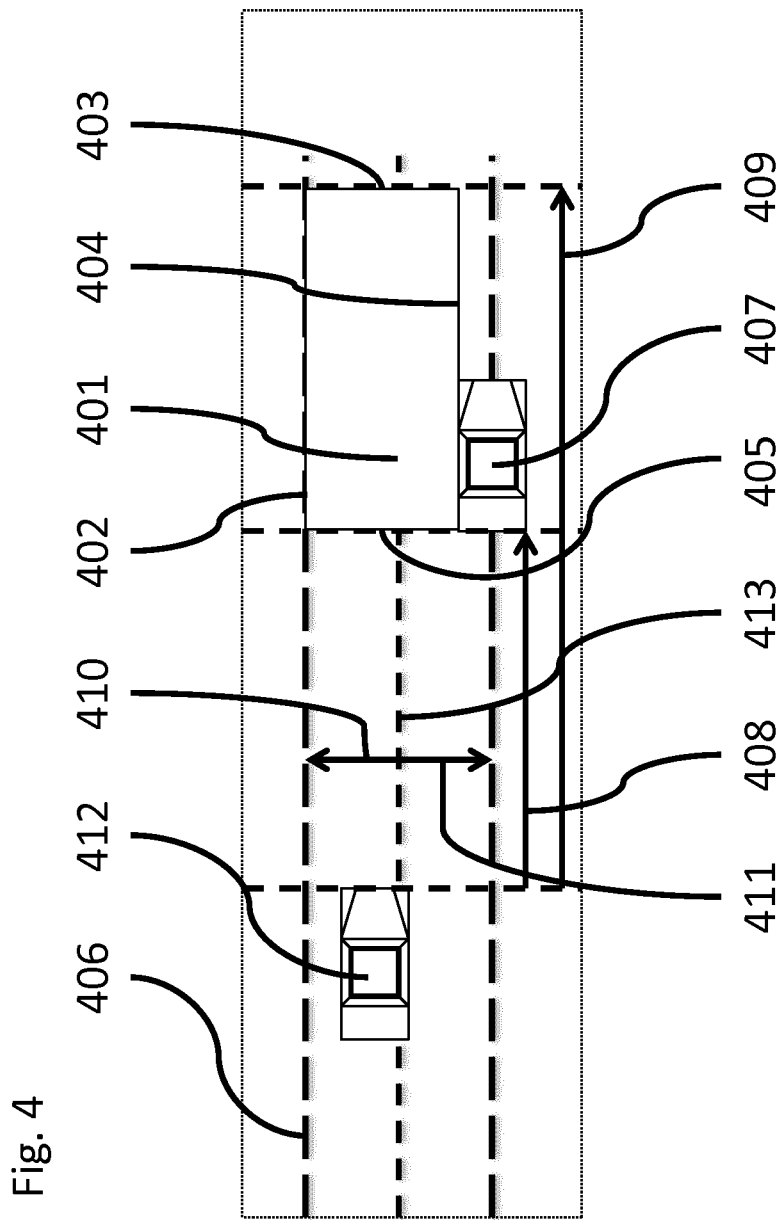
FIG. 4 is a view of another embodiment of a lane.

FIG. 4 illustrates a further lane segment 401. The lane segment has four lane segments limits 402, 403, 404, 405. In this case, the lane segment limit 402 is specified by the traffic lane marking 406; the lane segment limit 403 is defined by a free-space boundary, caused by a limited sensor range; the lane segment limit 404 is specified by an object 407, and the lane segment limit 405 is also specified by the object 407. The distances to the lane segment limits are indicated in a vehicle-related manner (408, 409) and also in a traffic-lane-related manner (410, 411). In the case of the vehicle-related distances 408, 409, the distance of the respective lane segment limit 402, 405 is indicated relative to the forward edge of the vehicle 412, whose surround is to be modeled. The traffic-lane-related distances 410 and 411 are measured starting from the center line 413 of the traffic lane.

Figure 5:
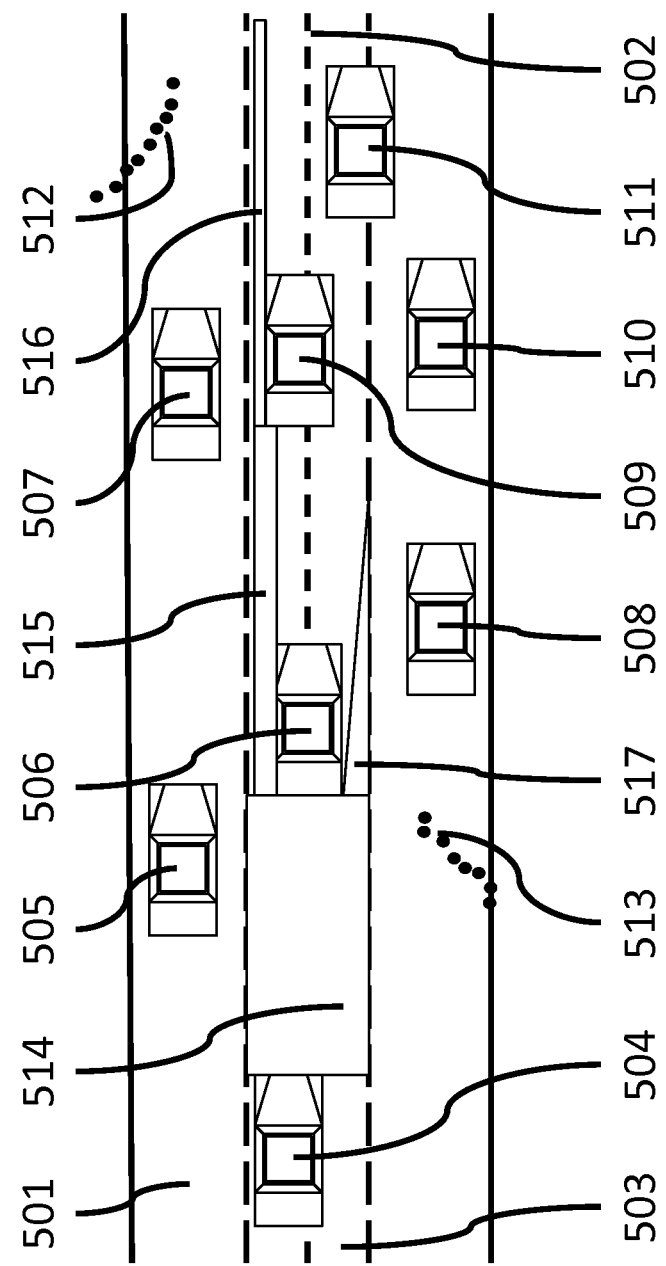
FIG. 5 is a view of a further embodiment of a lane.

FIG. 5 illustrates a further embodiment of a lane. The roadway section represented by the lane has three traffic lanes 501, 502, 503 on which, in addition to the vehicle 504 whose surroundings are to be modeled, a total of seven additional vehicles 505, 506, 507, 508, 509, 510, 511 are situated. Furthermore, free-space boundaries 512, 513 are shown by a dotted line. As explained above with a view to FIG. 1, the free-space boundaries 512, 513 shown in FIG. 5, within the scope of producing the surround model, can be merged, for example, to form a line. In the present case, the lane exclusively comprises lane segments 514, 515, 516, which are assigned to the traffic lane 502 traveled by the vehicle 504. An area of the traffic lane 502 is hidden by the object or the vehicle 506, which results in a blocking 517 of visibility. lane segments situated in areas of blocked visibility are removed from the lane.

Figure 6:
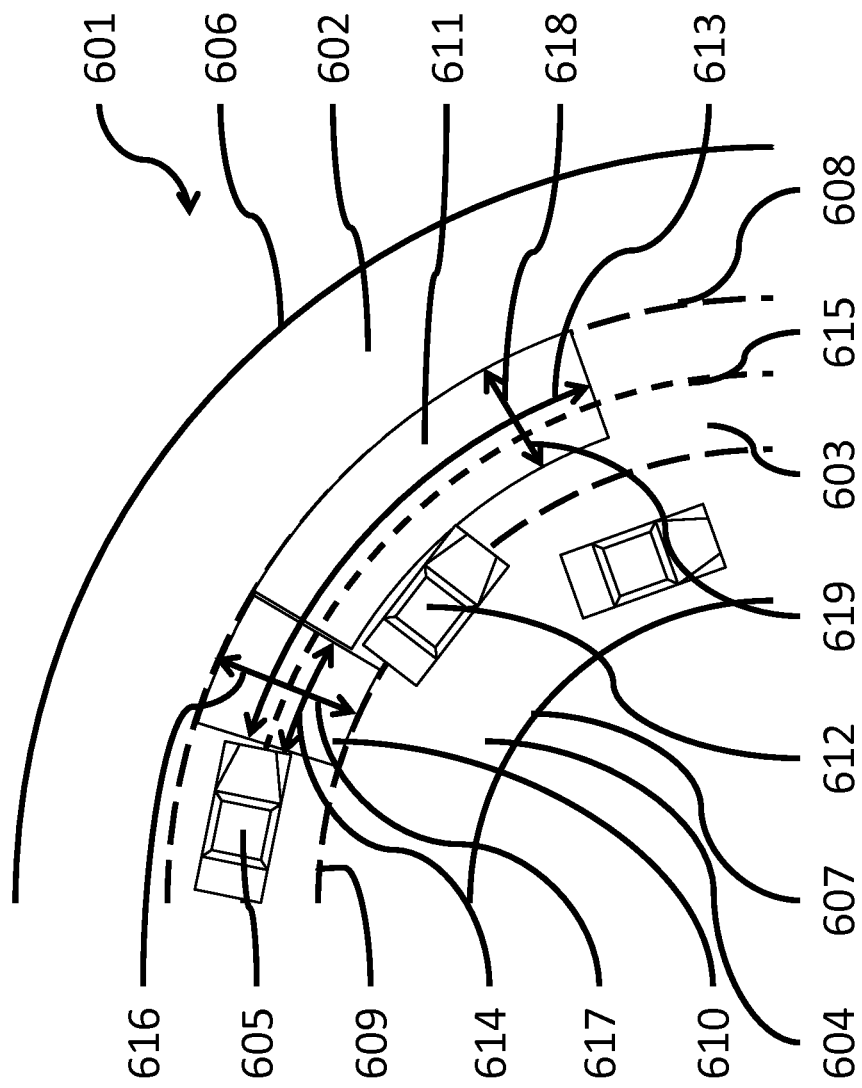
FIG. 6 is a view of an embodiment of a lane for a curved roadway course.

FIG. 6 shows an example of a curved roadway 601. The roadway 601 has three traffic lanes 602, 603, 604, in which case the vehicle 605, whose surround is to be modeled, is traveling on the center traffic lane 603. The roadway 601 is bounded by two roadway limitations 606, 607, and the traffic lane 603 is bounded by two traffic lane boundaries 608, 609. The surround of the vehicle 605 can be modeled by a lane, which comprises lane segments 610 611. In this case, the lane segment 610 is bounded toward the front by an object 612, a vehicle, and the lane segment 611 is bounded toward the front by a free-space boundary. The vehicle-related distances 613, 614 are indicated along the center line of the traffic lane 615, in which case the center line of the traffic lane 615 may, in particular, by a clothoid. The traffic-lane-related distances 616, 617, 618, 619 of the lane segments 611 are indicated to be perpendicular to the center line. In addition, a measurement of the curvature of the center line is indicated for each lane segment 611.

Figure 7:
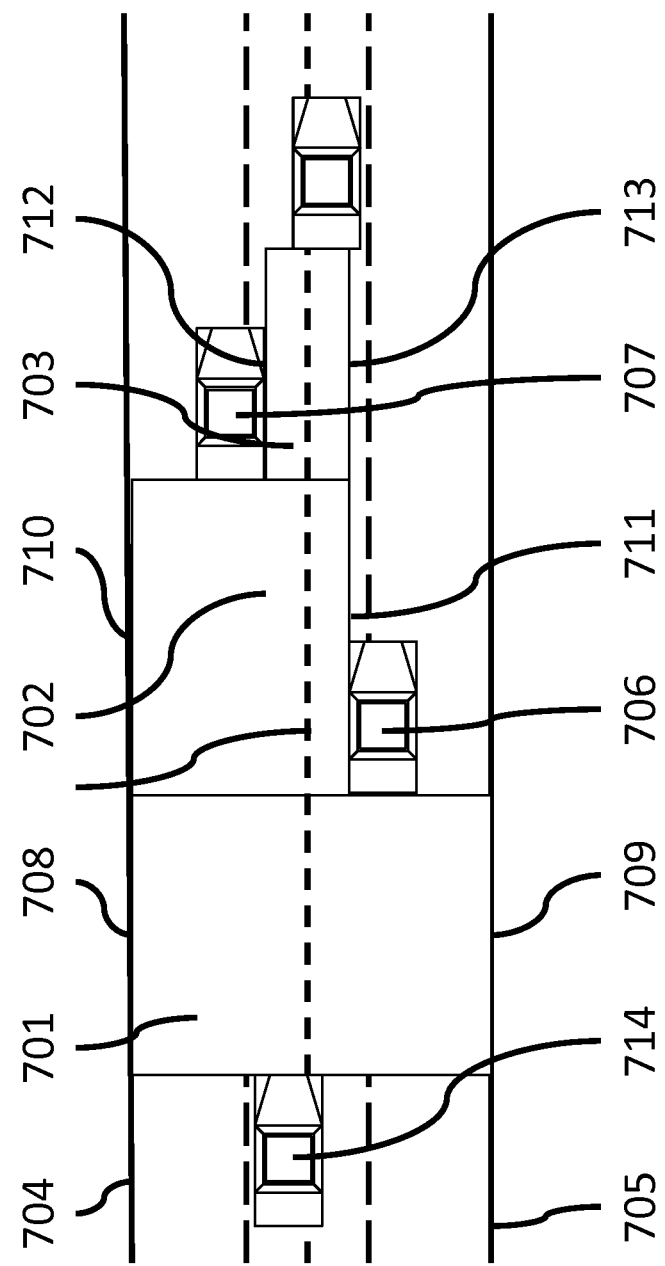
FIG. 7 is a view of an embodiment for an object-based lane.

FIG. 7 illustrates an example of an object-related lane model. The lane comprises three lane segments 701, 702, 703. In the lateral direction, the lane segments 701, 702, 703 are bounded only by the roadway limitations 704, 705 and objects 706, 707. The number of lane segments 701, 702, 703 can be limited to the first object 706, to the second object 707, etc. In this manner, the complexity of the calculations can be reduced. In the illustrated example, the distances to the lateral lane segment limitations 708, 709, 710, 711, 712, 713 relate to the center line of the roadway and the distances of the forward and rearward lane segment boundaries relate to forward axis of the vehicle 714, whose surround is to be modeled.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method comprising the acts of:
   receiving, at a controller, sensor data of at least one sensor system;
   identifying, by the controller, objects, free-space boundaries and roadway limitations based on the sensor data;
   defining, by the controller:
      a plurality of non-overlapping lane segments to each have a closed lane segment boundary that bounds a virtual area within a roadway lane surrounding the vehicle, based on each side of the closed lane segment boundary corresponding to one or more of: confines of the identified objects, free-space boundaries and roadway limitations, wherein the virtual area indicates a corresponding area of the roadway lane that can be freely traveled, and
      a lane as a set of the non-overlapping lane segments that indicate a collective area surrounding the vehicle that can be freely traveled, wherein the collective area is a non-overlapping distribution of the virtual areas;
   generating, by the controller, the computer model having the defined lane, the computer model being available to a driver assistance system of the vehicle;
   determining, by the driver assistance system, based on the computer model, a vehicle-related distance with respect to the lane segment boundary of the lane; and
   controlling the vehicle, by the driver assistance system, in an automated driving mode based on the computer model.

2. The method according to claim 1, wherein the at least one lane segment boundary is a front lane segment boundary, a rear lane segment boundary, a left lane segment boundary or a right lane segment boundary.

3. The method according to claim 1, wherein the lane segment is determined based on traffic lane boundaries.

4. The method according to claim 3, wherein
   at least a first lane segment is assigned to a traffic lane traveled by the vehicle,
   at least a second lane segment is assigned to a traffic lane not traveled by the vehicle, and
   the first lane segment and the second lane segment have an at least partially, common lane segment boundary.

5. The method according to claim 1, wherein a rate of change of the vehicle-related distance is determined for the at least one lane segment boundary.

6. The method according to claim 1, wherein an acceleration of a change in the vehicle-related distance is determined for the at least one lane segment boundary.

7. The method according to claim 5, wherein an acceleration of a change in the vehicle-related distance is determined for the at least one lane segment boundary.

8. The method according to claim 1, wherein a type of lane segment boundary is determined for the at least one lane segment boundary.

9. The method according to claim 1, wherein the lane segment and the vehicle-related distance of the lane segment boundary are determined taking into account a roadway course and/or a traffic lane boundary.

10. The method according to claim 1, wherein the lane segment and the vehicle-related distance of the lane segment boundary are determined taking into account a predicted travel route course.

11. The method according to claim 1, wherein
at least one confidence value is indicated for the lane segment, and
the confidence value indicates a probability by which free traveling can take place on the lane segment.

12. The method according to claim 1, wherein
a standard deviation is indicated for the vehicle-related distance of the lane segment boundary, for a rate of change of the vehicle-related distance of the lane segment boundary, and/or for an acceleration of a change in the vehicle-related distance of the lane segment boundary.

13. A surround model unit, comprising:
a receiving device that receives objects, free-space boundaries, roadway limitations and/or sensor data of at least one sensor system; and
a processor that executes processing to:
identify objects, free-space boundaries and roadway limitations based on the sensor data, define:
a plurality of non-overlapping lane segments to each have a closed lane segment boundary that bounds a virtual area within a roadway lane surrounding the vehicle, based on each side of the closed lane segment boundary corresponding to one or more of: confines of the identified objects, free-space boundaries and roadway limitations, wherein the virtual area indicates a corresponding area of the roadway lane that can be freely traveled, and
a lane as a set of the non-overlapping lane segments that indicate a collective area surrounding the vehicle that can be freely traveled, wherein the collective area is a non-overlapping distribution of the virtual areas, determine a vehicle-related distance with respect to the lane segment boundary of the lane, and
generate a computer model of the area surrounding the vehicle, the computer model having the defined lane; and
a output unit for sending the computer model to a driver assistance system that controls the vehicle in an automated driving mode based on the computer model.

14. A driver assistance system of a motor vehicle, comprising:
a control unit of the driver assistance system, the control unit being configured to receive a lane from a surround model unit according to claim 13; and
the control unit being further configured to regulate at least one operating parameter of the motor vehicle based on the received lane from the surround model unit.

15. The driver assistance system according to claim 14, wherein the at least one operating parameter is a speed or a distance of the vehicle from a traffic participant driving ahead of the vehicle.

16. A vehicle, comprising:
at least one sensor system for detecting surroundings of the vehicle;
a surround model unit, comprising:
a receiving device that receives objects, free-space boundaries, roadway limitations and/or sensor data of at least one sensor system; and
a processor that executes processing to:
identify objects, free-space boundaries and roadway limitations based on the sensor data,
define:
a plurality of non-overlapping lane segments to each have a closed lane segment boundary that bounds a virtual area within a roadway lane surrounding the vehicle, based on each side of the closed lane segment boundary corresponding to one or more of: confines of the identified objects, free-space boundaries and roadway limitations, wherein the virtual area indicates a corresponding area of the roadway lane that can be freely traveled, and
a lane as a set of the non-overlapping lane segments that indicate a collective area surrounding the vehicle that can be freely traveled, wherein the collective area is a non-overlapping distribution of the virtual areas,
generate a computer model of the area surrounding the vehicle, the computer model having the defined lane, and
determine a vehicle-related distance with respect to the lane segment boundary of the lane; and
a driver assistance system that receives the computer model, including the defined lane, from the surround model unit, wherein the driver assistance systems controls the vehicle in an automated driving mode, based on the computer model, to regulate at least one operating parameter of the vehicle based on the defined lane.

17. The vehicle according to claim 16, wherein the at least one operating parameter of the vehicle is a speed or a distance of the vehicle from a traffic participant driving ahead of the vehicle.

* * * * *